(12) United States Patent
Feigl

(10) Patent No.: US 6,918,592 B2
(45) Date of Patent: Jul. 19, 2005

(54) FACE SEAL DEVICE

(75) Inventor: Peter Feigl, Höhenrain (DE)

(73) Assignee: Burgmann Dichtungswerke GmbH and Co. KG, Wolfratshausen (DE)

( * ) Notice: Subject to any disclaimer, the term of this patent is extended or adjusted under 35 U.S.C. 154(b) by 0 days.

(21) Appl. No.: 10/329,786

(22) Filed: Dec. 27, 2002

(65) Prior Publication Data

US 2003/0122315 A1 Jul. 3, 2003

(30) Foreign Application Priority Data

Dec. 27, 2001 (DE) .................................. 201 20 966 U

(51) Int. Cl.$^7$ .............................................. F16J 15/34
(52) U.S. Cl. .................................. 277/370; 277/551
(58) Field of Search ............................ 277/358, 367, 277/370–373, 375, 377, 391–393, 397, 551; 29/418, 506, 516, 235

(56) References Cited

U.S. PATENT DOCUMENTS

| | | | |
|---|---|---|---|
| 2,871,040 A | | 1/1959 | Payne |
| 4,218,813 A | * | 8/1980 | Cather, Jr. .................. 277/551 |
| 4,335,888 A | * | 6/1982 | Ohba et al. .................. 277/379 |
| 4,639,000 A | * | 1/1987 | Warner ......................... 277/373 |
| RE32,646 E | * | 4/1988 | Wentworth ................. 277/371 |
| 4,779,876 A | * | 10/1988 | Novosad ..................... 277/397 |
| 4,971,337 A | * | 11/1990 | Hufford ...................... 277/371 |
| 4,976,446 A | * | 12/1990 | Fornof ....................... 277/370 |
| 5,052,695 A | * | 10/1991 | Curtis ......................... 277/551 |
| 5,123,660 A | * | 6/1992 | Dahlheimer et al. ........ 277/393 |
| 5,344,164 A | * | 9/1994 | Carmody et al. ........... 277/371 |
| 5,503,404 A | * | 4/1996 | Newton et al. ............. 277/551 |
| 5,797,602 A | * | 8/1998 | Less ............................ 277/372 |
| 6,003,875 A | * | 12/1999 | Ellis et al. .................. 277/370 |
| 6,695,315 B1 | * | 2/2004 | Anderberg .................. 277/370 |

FOREIGN PATENT DOCUMENTS

| | | |
|---|---|---|
| CH | 426 400 A | 12/1966 |
| DE | 10 16 518 B | 9/1957 |
| DE | 74 04 061 U | 5/1975 |
| DE | 25 40 556 C3 | 4/1976 |
| DE | 79 25 908 U1 | 6/1980 |
| DE | 33 18 296 A1 | 12/1983 |
| DE | 39 27 589 A1 | 3/1991 |
| DE | 44 18 650 A1 | 11/1995 |
| DE | 195 02 466 A1 | 8/1996 |
| DE | 297 14 224 U | 10/1997 |
| EP | 0 005 159 A1 | 11/1979 |
| EP | 1 024 319 A2 | 8/2000 |
| FR | 1 326 296 A | 5/1963 |
| SU | 732 276 A | 3/1980 |

* cited by examiner

Primary Examiner—Daniel P. Stodola
Assistant Examiner—Christopher J. Boswell
(74) Attorney, Agent, or Firm—Sughrue Mion, PLLC

(57) ABSTRACT

A face seal device for sealing a shaft relative to a casing includes a pair of co-operating seal rings, one of said seal rings serving for non-rotational mounting on the casing and the other for common rotation with the shaft. The seal rings include bores through which the shaft is extended when in operation, and which are held in radial alignment with the shaft by a mounting member which can be inserted in the bores and withdrawn from engagement with the bores by an axial force which can be applied to the mounting member. The seal rings are held in the operational positional relationship of each other by a pair of axially spaced axial stops on the mounting member between which the seal rings are disposed. One of the stops engages the non-rotational seal ring and the other the rotating seal ring. The axial stop engaging the rotating seal ring is held radially resiliently.

16 Claims, 1 Drawing Sheet

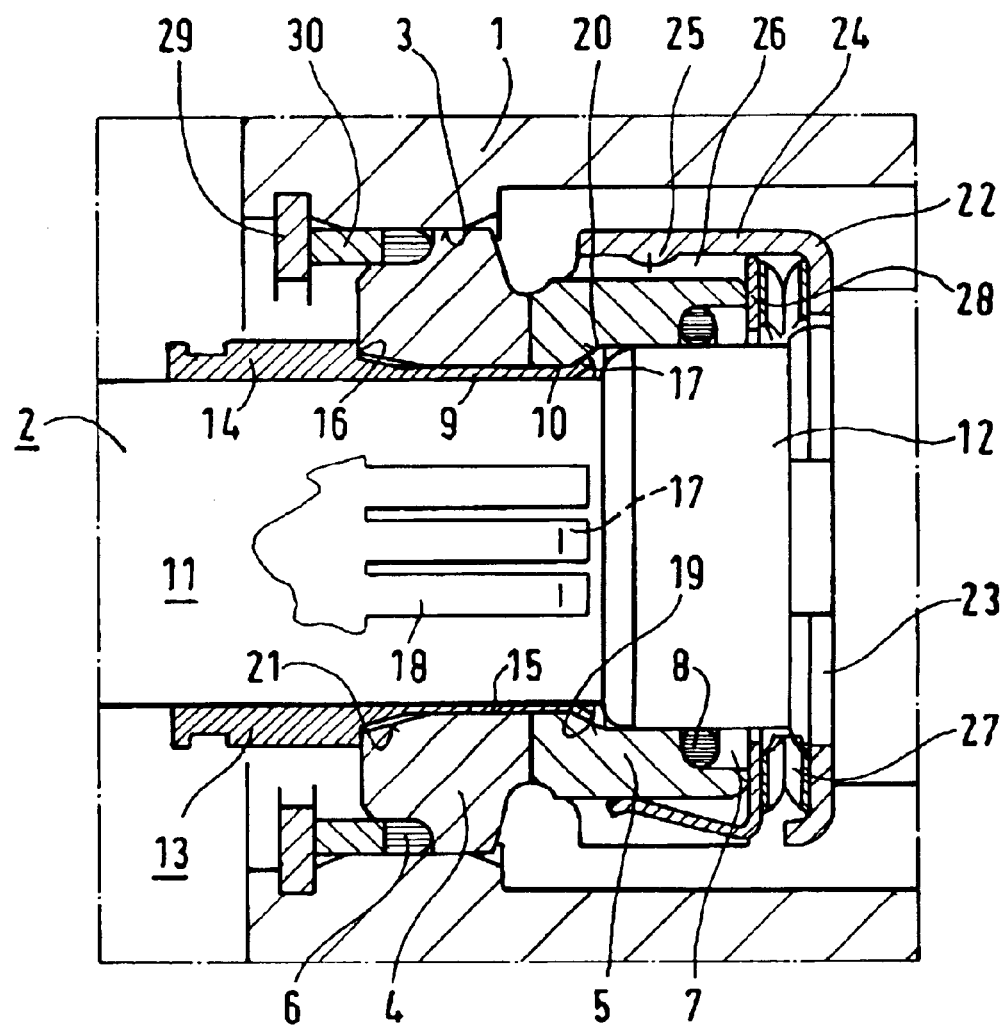

FACE SEAL DEVICE

The following disclosure is based on German utility model application No. 20120966.7, filed on December 27, which is incorporated into this application by reference.

FIELD OF AND BACKGROUND OF THE INVENTION

The invention relates to a face seal device for sealing a shaft with respect to a casing and more particularly to a face seal device including a mounting aid which simplifies the mounting of the face seal device on a shaft. A known face seal device of this type (DE-A-3318296) has a mounting aid in the form of a sleeve upon the outer periphery of which a seal ring held on a mounting gland and representing the non-rotational seal ring of a pair of co-operating seal rings is disposed. Furthermore, the mounting gland acts as a carrier for diverse auxiliary means such as a biasing means and a secondary sealing means. The sleeve, together with the seal ring and the mounting gland, can be pushed onto the shaft and be withdrawn from the seal ring after fixing the mounting gland to the casing. Furthermore, the rotating seal ring can be seated on the end of the sleeve using a frictional seating, whereby this seal ring will attain its final operational alignment relative to the non-rotational seal ring only when caused to engage the shaft, but not prior thereto by means of the sleeve. Thus, in the first place, the sleeve is but a mounting aid for less skilled personnel. Automatic assembly of the face seal device in the course of an apparatus production line process cannot be contrived. Furthermore, a face seal device in the form of a unit ready for assembly is known (EP-A-1024319). This face seal device does not comprise a mounting aid and while being suitable for use in an apparatus production line process, has a complicated construction and is therefore expensive to manufacture.

OBJECTS OF THE INVENTION

An object of the invention is to provide an improved face seal device for use in conjunction with a mounting aid suitable for employment on fully automatic apparatus production lines. Another object of the invention is to provide a face seal device for use in conjunction with a mounting aid, which is of simple, economical construction. Still another object of the invention is to provide a face seal device for use in conjunction with a mounting aid, which can be used in refrigerant compressors for air-conditioning systems of motor vehicles utilising $CO_2$ as the refrigerant at correspondingly high pressures that need to be sealed.

SUMMARY OF THE INVENTION

These and other objects are solved in accordance with the present invention by a face seal device for sealing a shaft relative to a casing, which includes a pair of co-operating seal rings, one of said seal rings serving for non-rotational mounting on the casing and the other for common rotation with the shaft. The seal rings include bores through which the shaft is extended when in operation, and which are held in radial alignment with the shaft by a mounting member which can be inserted in the bores and withdrawn from engagement with the bores by an axial force which can be applied to the mounting member. The seal rings are held in the operational positional relationship of each other by a pair of axially spaced axial stops on the mounting member between which the seal rings are disposed. One of the stops engages the non-rotational seal ring and the other the rotating seal ring. The axial stop engaging the rotating seal ring is held radially resiliently.

Accordingly the face seal device comprises a mounting member upon which the co-operating seal rings are disposed and retained in their mutual operational positional relationship, in that the seal rings are not only radially fixed in their radial positions by virtue of the radial dimensions of the mounting member, but are also axially fixed in their respective axial positions between a pair of axially spaced stops provided or formed on the mounting member. Thereby, the mounting member defines the desired final radial and axial alignment of the seal rings which is essential for the functioning of the face seal device without the need for assistance by skilled personnel. The invention thus enables ready-to-operate assembly of the face seal device by means of automatic robotic assembly machines or the like so that the mounting process can be incorporated as a step in a production line process. The mounting member can be easily removed after the face seal device has been placed at the appropriate position on the apparatus needing sealing, in that an axial force is exerted on the mounting member which causes one of the axial stops fixing the position of the seal rings to be moved from the stop position into a release position. The desired precise radial and axial alignment of the seal rings is not thereby adversely affected since the withdrawal of the mounting member no longer has any effect upon the alignment of the seal rings once these have been mounted at their positions. The mounting member itself may be a reusable member which can be produced economically, preferably by means of injection moulding of a plastics material. Furthermore, the invention offers the advantage that the face seal device is of uncomplicated and thus economical construction, since mounting rests or seal casings that have been required up to now for fixing the seal rings can be dispensed with in that this function is now accomplished by the mounting member.

In accordance with a preferred embodiment of the invention, the face seal device is a mounting unit which, in addition to effecting the mutual radial and axial alignment of the seal rings, may comprise auxiliary devices, such as coupling means for transferring torque from the shaft to the rotating seal ring, secondary sealing means such as O-rings, as well as suitable biasing means such as plate springs. The carrier of these auxiliary devices is the rotating seal ring so that the auxiliary devices are retained in their operational positions during assembly and can be placed into the functional positions appropriate thereto without thereby affecting or becoming involved in the mutual positioning of the seal rings.

BRIEF DESCRIPTION OF THE DRAWING

The invention will be explained in more detail hereinafter with reference to the drawing showing an embodiment of the invention. The drawing shows a longitudinal sectional view of a face seal device made in accordance with the invention in conjunction with its mounting to a boring of an apparatus which is to be sealed.

DETAILED DESCRIPTION OF A PREFERRED EMBODIMENT

The casing (only shown fragmentarily in the drawing) of an apparatus that is to be sealed by means of a face seal device according to the present invention, e.g. a casing of a refrigerant compressor for compressing a refrigerant such as $CO_2$, is indicated by the reference number 1. A shaft, e.g. a compressor drive shaft, passes through a boring 3 in the casing, and is indicated by the reference number 2. The face seal device serves for sealing the shaft 2 relative to the boring 3.

It should be understood that the invention is not restricted to the aforesaid specific field of application, but it will offer advantages whenever assembly of a face seal device is to be effected, preferably automatically e.g. by means of so-called robotic assembly machines, and a certain predetermined positional relationship between the components of the face seal device has to be provided and maintained with a high degree of precision.

The face seal device comprises a pair of co-operating seal rings 4, 5, of which one seal ring 4 is provided for non-rotational mounting on the casing 1 and the other seal ring 5 for common rotation with the shaft 2. An O-ring 6 is provided for sealing the non-rotational seal ring 4 relative to the boring 3. The O-ring 6 is inserted into a groove in the outer periphery of the non-rotational seal ring 4. The seal ring 5 rotating in common with the shaft 2 has an axial recess 7 in the peripheral inner surface thereof facing the shaft 2 in which an O-ring 8 is inserted for providing a seal between the rotating seal ring 5 and the shaft 2. The seal rings 4, 5 have radial sealing faces facing each other between which a seal gap can be formed in operation for allowing non-contact making running of the face seal device. The seal rings 4, 5, and especially the bores 9, 10 therein through which the shaft 2 extends, must be precisely aligned relative to each other both axially and radially. The basic construction of the face seal device described above is known so that there is no need for a description of further details.

The shaft 2 has a portion 11 of reduced diameter and a portion 12 of enlarged diameter. The cross-section of the rotating seal ring 5 is such that it can peripherally surround the adjacent sections of both of the shaft portions 11, 12.

A mounting member 13, which may be in the form of a sleeve or a tube section, is provided for maintaining the axial and radial positional relationship of the seal rings 4, 5 relative to each other prior to and during assembly of the face seal device on the boring 3. The mounting member 13 comprises an axial outer portion 14 which is located outside the bores 9, 10 of the seal rings 4, 5, and having a wall thickness such as to provide sufficient stiffness to this portion. Furthermore, the mounting member 13 comprises an inner portion 15 located within the bores 9, 10 and having a reduced wall thickness corresponding to that of a desired operational gap which is to be provided between the bores 9, 10 of the seal rings 4, 5 and the shaft portion 11. This gap remains following the assembly of the face seal device and removal of the mounting member 13.

A first axial stop 16 in the form of a shoulder is provided at a transition point between the inner and outer portions 14, 15 of the mounting member 13, and a second axial stop 17 is provided at or near the end of the portion 15 opposite the transition point. The rotating seal ring 5 abuts the second axial stop 17 and the non-rotational seal ring 4 abuts the first axial stop 16. Thus the seal rings 4, 5 are positioned precisely in their mutual axial and radial positional relationship by the inner portion 15 and the stops 16, 17 of the mounting member 13, and this positional relationship of the seal rings will be maintained unaltered during a subsequent assembly process.

The second axial stop can be formed by a plurality of protrusions or cams 17 projecting radially outwardly from spring elements in the form of tongues 18 provided on the inner portion 15 of the mounting member 13. These radial cams 17 are aligned to each other in the peripheral direction. Each of the cams 17 can engage behind an inclined shoulder 20 formed an the rotating seal ring 5. The shoulder 20 is located at a transition point between the bore 10 and an enlarged bore of the rotating seal ring 5 accommodating the portion 12 of the shaft. Each cam 17 may comprise an inclined surface 19 which is formed in complementary manner to the inclined shoulder 20 of the rotating seal ring 5 so that the inclined surface 19 can glide upon the shoulder 20.

The engagement of the cams 17 with the inclined shoulder 20 produces an axial frictional support for the rotating seal ring 5 so that the rotating seal ring 5 is prevented from effecting an axial movement away from the non-rotational seal ring 4 as along as no axial force is applied to the mounting member 13. On the other hand, this structure makes it possible for the mounting member 13 to be withdrawn from an engagement with the bores 9, 10 in the seal rings 4, 5 following the assembly of the face seal device. The resilient elements or tongues 18 carrying the cams 17 at their free ends are provided in order to simplify such withdrawal, in that they can yield radially inwards from the stop position shown in the drawing when a radial force is exerted on the the mounting member 13 and hence the cams 17. This results in a movement of the cams 17 along the inclined shoulder 20 during the withdrawal of the mounting member 13. Insofar as this force is not effective, the cams 17 are maintained in the stop position by the biasing force exerted by the resilient tongues 18.

The resilient tongues 18 may be formed by a plurality of peripherally distributed axial incisions formed in the inner portion 15 of the mounting member 13. However, rather than a plurality of resilient tongues 18, just a pair of such tongues could be provided to project axially from diametrically opposite locations of the portion 15. In addition, the entire inner portion 15 of the mounting member 13 could be in the form of two or more peripherally distributed brackets having resilient properties.

Near the axial end remote from the rotating seal ring 5 the bore 9 in the non-rotational seal ring 4 can be enlarged conically, as is indicated at 21, in order to simplify the insertion of the inner portion 15 of the mounting member 13 and the radially outwardly projecting cams 17 provided thereon.

Furthermore, the face seal device is completed by a driver device in the form of a driver casing 22 for conveying the rotary movement of the shaft 2 to the rotating seal ring 5. The driver casing 22 comprises a radial portion 23 incorporating a driver protuberance 25 which engages in an axial groove 26 in the outer periphery of the rotating seal ring 5 for transferring torque, and a portion 24 axially projecting from the radial portion 23. The radial portion 23 of the driver casing 22 includes a multi-edge opening in which a correspondingly multi-edge shaped section of the shaft 2 can engage in order to produce a coupling between the driver casing 22 and the shaft 2. The radially outer dimensions of the driver casing 22 are smaller by a suitable amount than those of the non-rotational seal ring 4.

Furthermore, provision is made for a biasing means 27, e.g. in the form of a plate spring which is supported at one axial end on the driver casing 22 and at the other axial end thereof on a support ring 28 including a clip extending from the outer periphery of the support ring 28. The support ring 28 can be mounted on the rotating seal ring 5 by means of the clip and abuts the end face of the seal ring 5 which is remote from the non-rotational seal ring 4. The support ring 28 thereafter simultaneously closes the outer axial end of the recess 7 accommodating the O-ring 8 so that the O-ring 8 will be prevented from falling out of the recess 7.

For the purposes of assembling the face seal device constructed as described hereinabove, wherein the seal rings 4, 5 are held in a precise radial and axial positional relationship by the mounting member 13 and the rotating seal ring 5 carrying the driver casing 22, the O-ring 8, the biasing means 27 and the support ring 28, the face seal device is mounted on the shaft 2 as a unit and is axially displaced on the shaft 2 until the multi-edge opening of the driver casing 22 engages in coupling manner with the correspondingly shaped multi-edge section of the shaft 2, thereby the biasing means 27 is axially compressed by a certain amount during this process in order to exert an axial bias force on the rotating seal ring 5. A spring washer 29 is then inserted into a groove provided in the boring 3 in the casing for axial support of the non-rotational seal ring 4 in order to position the face seal device relative to the shaft 2. If desired, a spacer ring 30 may be provided between the spring washer 29 and the non-rotational seal ring 4. The spacer ring 30 simultaneously serves for axially biasing the O-ring 6 whereby the seal between the non-rotational seal ring 4 and the boring 3 will be improved. Thereafter, an external axial force of sufficient strength can be applied to the mounting member 13 so as to cause the cams 17 to slide along the inclined shoulder 20 in order to move the cams 17 out of engagement from behind the rotating seal ring 5. The mounting member 13 can then be withdrawn from the bores 9, 10 of the seal rings 4, 5, while the predefined radial and axial alignment of the seal rings 4, 5 will be maintained.

Thus, the face seal device can be assembled in an automatic assembly process by means of known robotic assembly machines while an extremely precise alignment of the components of the face seal device both relative to one another as well as to the shaft is maintained.

The mounting member 13 may be a blank of any suitable metallic material. However, the mounting member 13 is preferably a blank of a suitable, possibly fibre-reinforced plastics material such as polyamide, which can be manufactured economically by an injection moulding process in large numbers. Basically, the mounting member may be re-used in that it can be inserted into the bores of another face seal device made in accordance with the present invention following its use in a preceding assembly operation.

The driver casing 22, the biasing means 27, the support ring 28 and the O-ring 8 are not subjected to axial loads when the mounting member 13 is introduced into the bores 9, 10 of the seal rings 4, 5. It should be understood that the invention is not restricted to such auxiliary equipment, but other suitable means of could also be provided. Furthermore, the sealing means producing the sealing of the seal rings relative to the boring in the casing or relative to the shaft need not be in the form of O-rings but other suitable secondary seals could also be provided such as are known to the skilled person for this purpose and thus need not be explained in greater detail.

The above description of a preferred embodiment has been given by way of example. From the disclosure given, those skilled in the art will not only understand the present invention and the attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A face seal device for sealing a shaft relative to a casing, including
    a pair of co-operating seal rings, one of said seal rings serving for non-rotational mounting on the casing and the other of said seal rings serving for common rotation with the shaft,
    said seal rings including bores through which the shaft is extended when in operation, said seal rings being held in radial alignment with the shaft by a mounting member, and
    said seal rings being held in an operational positional relationship of each other by a pair of axially spaced axial stops on the mounting member between which the seal rings are disposed,
    one of said axial stops engaging the non-rotational seal ring and the other of said axial stops engaging the rotating seal ring,
    wherein said mounting member is axially movable relative to said seal rings when an external axial force is applied to the mourning member, in that said other axial stop engaging the rotating seal ring is held radially resiliently for moving said other axial stop from engagement with said rotating seal ring, for withdrawing said mounting member from said seal rings;
    wherein the seal rings are provided in a final operational position after the mounting member is withdrawn.

2. The face seal device according to claim 1, wherein the axial stop engaging the rotating seal ring comprises a plurality of resilient elements formed on the mounting member.

3. The face seal device according to claim 1, wherein the axial stop engaging the non-rotational seal ring comprises a substantially rigid shoulder formed on the mounting member.

4. The face seal device according to claim 1, wherein the bore extending through the non-rotational seal ring is enlarged conically at an end portion thereof remote from the rotating seal ring.

5. The face seal device according to claim 1, wherein the mounting member has an inner portion for seating in the bores of the seal rings, said inner portion having a wall thickness corresponding to a desired play remaining between the shaft and the bores when the mounting member is withdrawn from said seal rings.

6. The face seal device according to claim 1, wherein the mounting member is formed of a plastics material.

7. The face seal device according to claim 1, wherein the mounting member is formed of a metallic material.

8. The face seal device according to claim 1, further including coupling means for coupling the rotating seal ring to the shaft for conveying torque from the shaft to the seal ring,
    secondary sealing means for sealing the seal rings relative to the casing and the shaft, and biasing means for applying a bias force to one of the seal rings for urging the one seal ring against the other seal ring,
    the face seal device being formed as a mounting unit in which the coupling means, the secondary sealing means and the biasing means are held on the rotating seal ring.

9. The face seal device according to claim 1, wherein the other axial stop engages the rotating sealing ring at a radial inner surface of the rotating sealing ring.

10. The face seal device according to claim 9, wherein the other axial stop is at least one protrusion.

11. A face seal device for sealing a shaft relative to a casing, including
    a pair of cooperating seal rings, one of said seal rings serving for non-rotational mounting on the casing and the other for common rotation with the shaft, said seal rings including bores through which the shaft is extended when in operation, and being held in radial alignment with the shaft by a mounting member which can be inserted in the bores and withdrawn from engagement with the bores by an axial force when applied to the mounting member, said seal rings being held in the operational positional relationship of each other by a pair of axially spaced axial stops on the mounting member between which the seal rings are disposed, one of said stops engaging the non-rotational seal ring and the other engaging the rotating seal ring, whereby the axial stop engaging the rotating seal ring is held radially resiliently;

wherein the seal rings are provided in a final operational position after the mounting member is withdrawn.

12. The face seal device according to claim 11, wherein the other axial stop engages the rotating sealing ring at a radial inner surface of the rotating sealing ring.

13. The face seal device according to claim 12, wherein the other axial stop is at least one protrusion.

14. A device, comprising:

a shaft and a casing;

a pair of seal rings, one of said seal rings mounted non-rotationally on the casing, and the other of said seal rings mounted to rotate with the shaft, said seal rings including bores configured to receive said shaft;

a mounting member releasably holding said seal rings in radial alignment with said shaft and releasably holding said seal rings relative to each other when said mounting member is inserted in the bores between said seal rings and said shaft in a first position of the mounting member, and releasing said seal rings when said mounting member is in a second position offset from the first position, wherein the mounting member is withdrawn from the seal rings when the mounting member is in the second position;

wherein said mounting member comprises a pair of axial stops axially offset relative to each other, said axial stops are configured for the releasable holding of said seal rings relative to each other, and at least one of said axial stops is configured to be radially resilient, thereby configuring said mounting member to variously hold or release said seal rings in accordance with the first and second positions of said mounting member;

wherein, when the mounting member is moved to the second position, the seal rings are provided in a final operational position.

15. The face seal device according to claim 14, wherein the other axial stop engages the rotating sealing ring at a radial inner surface of the rotating sealing ring.

16. The face seal device according to claim 15, wherein the other axial stop is at least one protrusion.

* * * * *